US010977250B1

(12) United States Patent
Lesner et al.

(10) Patent No.: US 10,977,250 B1
(45) Date of Patent: Apr. 13, 2021

(54) RESPONDING TO SIMILARITY QUERIES USING VECTOR DIMENSIONALITY REDUCTION

(71) Applicant: INTUIT INC., Mountain View, CA (US)

(72) Inventors: Christopher Z. Lesner, Palo Alto, CA (US); Alexander S. Ran, Palo Alto, CA (US); Marko Rukonic, San Jose, CA (US); Wei Wang, San Jose, CA (US)

(73) Assignee: Intuit, Inc., Mountain View, CA (US)

( * ) Notice: Subject to any disclaimer, the term of this patent is extended or adjusted under 35 U.S.C. 154(b) by 225 days.

(21) Appl. No.: 16/128,387

(22) Filed: Sep. 11, 2018

(51) Int. Cl.
*G06F 16/2453* (2019.01)
*G06Q 30/02* (2012.01)
*G06F 16/951* (2019.01)
*G06F 16/22* (2019.01)

(52) U.S. Cl.
CPC .... *G06F 16/24542* (2019.01); *G06F 16/2237* (2019.01); *G06F 16/951* (2019.01); *G06Q 30/0201* (2013.01)

(58) Field of Classification Search
USPC ........................................ 707/749, 714, 715
See application file for complete search history.

(56) References Cited

U.S. PATENT DOCUMENTS

| | | | | |
|---|---|---|---|---|
| 5,630,121 A * | 5/1997 | Braden-Harder | ....... | G06F 16/58 |
| 5,915,038 A * | 6/1999 | Abdel-Mottaleb | ..... | G06T 9/007 |
| | | | | 382/209 |
| 6,036,349 A * | 3/2000 | Gombar | ................. | G05B 17/02 |
| | | | | 703/6 |
| 8,117,213 B1 * | 2/2012 | Nakano | ............... | G06F 16/2264 |
| | | | | 707/749 |
| 8,639,596 B2 * | 1/2014 | Chew | ..................... | G06Q 40/00 |
| | | | | 705/30 |
| 8,655,878 B1 * | 2/2014 | Kulkarni | ............. | G06F 16/7847 |
| | | | | 707/736 |
| 10,592,995 B1 * | 3/2020 | Ouyang | ............... | G06Q 40/123 |
| 10,650,068 B2 * | 5/2020 | Mertens | .............. | G06F 16/9535 |
| 2002/0118881 A1 * | 8/2002 | Choi | ................... | G06F 16/5854 |
| | | | | 382/203 |
| 2005/0021508 A1 * | 1/2005 | Matsubayashi | ..... | G06F 16/3347 |
| 2009/0307208 A1 * | 12/2009 | Peng | ..................... | G06F 16/334 |
| 2013/0030913 A1 * | 1/2013 | Zhu | ..................... | G06Q 30/0241 |
| | | | | 705/14.52 |
| 2014/0006191 A1 * | 1/2014 | Shankar | ................ | H04L 63/107 |
| | | | | 705/18 |
| 2015/0345969 A1 * | 12/2015 | McGavran | ......... | G06Q 30/0205 |
| | | | | 701/409 |

(Continued)

*Primary Examiner* — Cam Linh T Nguyen
(74) *Attorney, Agent, or Firm* — Patterson + Sheridan LLP

(57) ABSTRACT

Certain aspects of the present disclosure provide techniques for determining similarities between businesses. One example method generally includes receiving a similarity query and receiving transaction data associated with a plurality of businesses for comparing the plurality of businesses. The method further includes generating a set of vectors representing the plurality of businesses based on the transaction data and generating a set of compact vectors based on the vectors by applying a dimensionality reduction technique. The method further includes generating based on the set of compact vectors, a similarity index and determining a response to the similarity query using the similarity index.

20 Claims, 5 Drawing Sheets

(56) References Cited

U.S. PATENT DOCUMENTS

| | | | |
|---|---|---|---|
| 2017/0116379 A1* | 4/2017 | Scott | G16B 50/00 |
| 2018/0046967 A1* | 2/2018 | Ghosh | G06Q 10/06393 |
| 2018/0096060 A1* | 4/2018 | Peled | G06F 16/93 |
| 2019/0130025 A1* | 5/2019 | Crudele | G06F 16/334 |
| 2019/0378206 A1* | 12/2019 | Shady | G06Q 40/00 |

* cited by examiner

RESPONDING TO SIMILARITY QUERIES USING VECTOR DIMENSIONALITY REDUCTION

INTRODUCTION

Aspects of the present disclosure relate generally to software applications and more particularly to software applications that respond to user queries.

Businesses may wish to compare themselves with competitors for purposes of competitive analysis, among others. For example, the business owner may be interested to know how much similar businesses spend on marketing or payroll, what kinds of employee benefits, growth indicators or vendor terms similar businesses have, among other business information. A business management service may be able to improve the experience for users by offering such information. However, determining which businesses are similar to other businesses is not an easy task. In particular, determining business similarity in a data-oriented or objective way has proven difficult.

Existing methods of determining similarity are limited by the types of data available and the methods of comparison. For example, determining similarity may be possible by comparing various externally-viewable attributes about businesses, such as demographic information. Such demographic information may include, as examples, the location of the businesses, the age of the businesses, the industry type of the businesses or the number of employees of the businesses. The collection of such information presents problems, such as that some may be self-reported and thus unreliable, incomplete or out of date. Further, even if such information was reliably collected, comparisons based on demographic information have inherent limitations. For example, two businesses of approximately the same size and in similar industries may nonetheless be dissimilar in the ways a business owner may find useful (such as financial information). Further still, calculations of demographic data can be strenuous and resource-intensive for the computer, given the number of dimensions on which businesses can be compared. Therefore, systems and methods are needed for efficiently determining the similarities of businesses.

BRIEF SUMMARY

Certain embodiments provide a method for determining similarities between businesses. The method generally includes receiving a similarity query and receiving transaction data associated with a plurality of businesses for comparing the plurality of businesses. The method further includes generating a set of vectors representing the plurality of businesses based on the transaction data and generating a set of compact vectors based on the vectors by applying a dimensionality reduction technique. The method further includes generating based on the set of compact vectors, a similarity index and determining a response to the similarity query using the similarity index.

Other embodiments include a computing device comprising a processor and memory including instructions that cause the computing device to perform the method for determining similarities between businesses described above. Still other embodiments provide a non-transitory computer readable medium storing instructions that can cause a computing device to perform the method for determining similarities between businesses described above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
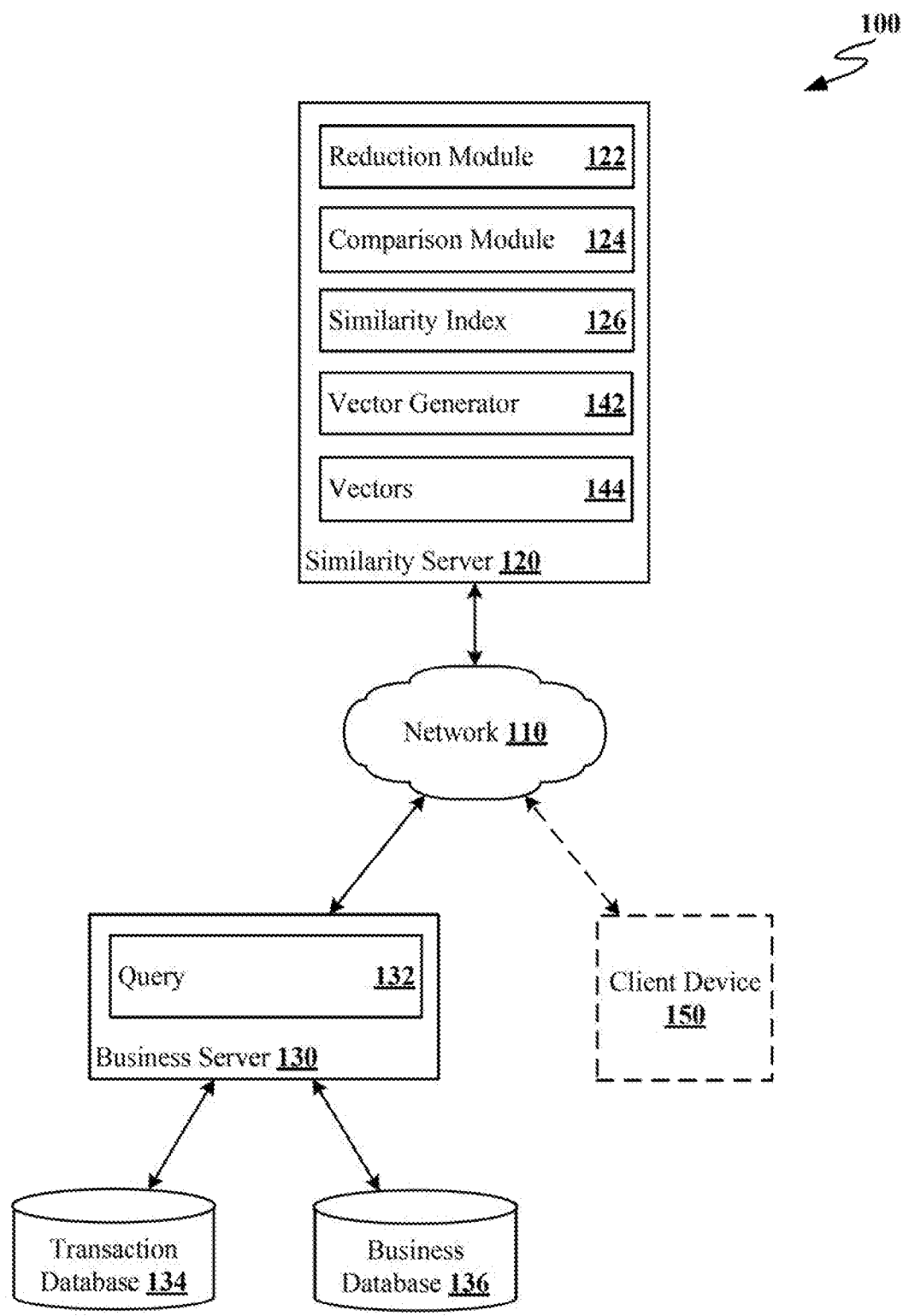
FIG. 1 shows an example computing environment for responding to similarity queries.

Aspects of the present disclosure provide apparatuses, methods, processing systems, and computer readable mediums for efficiently determining the similarities of businesses.

One way to determine business similarity without using demographic information of the businesses is to represent quantifiable financial information of the businesses as vectors, and to then perform vector similarity calculations on those vectors. Vectors are multi-dimensional, and may have as many dimensions as needed to fully represent the data. In the case of vectors representing business data, the vectors may have a large number of dimensions. For example, if a record of each businesses' transactions are used to identify vendors that the businesses have had transactions with, the vectors may have thousands of dimensions. Vectors of such size are large enough to lead to considerable difficulty when performing similarity calculations. In order to perform calculations related to the similarity of businesses more efficiently, data relating to the businesses may be simplified before calculation.

In particular, by applying a dimensionality reduction technique, the vectors can be used to create a set of compact vectors which allow for more efficient computation. The compact vectors may be used to create a similarity index, a tool to categorize the compact vectors. Then, if a query requesting business similarity information is received, the similarity index can be used to calculate the response to the query by performing a lookup for similar vectors within the similarity index. For example, if the query identifies a particular business to find similar businesses for, the similarity index can be used to identify vectors similar to a vector corresponding to the particular business. A response to the query may be generated using information of the businesses that are associated with those similar vectors.

One advantage of the systems and methods described herein is improved efficiency in calculating responses to similarity queries. In particular, performing calculations or computations on vectors with many thousands of dimensions is impractical and inefficient. Significant time and processing resources are used to perform such calculations. Further, vectors with many dimensions occupy high dimensional, and thus sparse, vector spaces. Calculations of such vectors are therefore subject to significant noise, which make the output of the calculations less reliable and more error prone. By using dimensionality reduction to produce compact vectors, these calculations can be performed more quickly, more efficiently, with less risk of error and with greater reliability, thus improving the functioning of computing devices performing the calculations by freeing processing resources for other tasks. Additionally, the difficulty of calculating large business vectors may prevent computerized similarity query services from being offered. Thus, the present disclosure allows for the automation of responding to business similarity queries, which is currently not possible.

FIG. 1 shows an example computing environment 100 for responding to similarity queries. As shown, computing environment 100 includes similarity server 120, business server 130 and client device 150, all in communication via network 110. Computing environment 100 also includes transaction database 134 and business database 136 linked to business server 130. Although shown as separate devices, in other embodiments the functions of servers 120 and 130 may be performed by a single server or other computing device. Further, in other embodiments the functions of databases 134 and 136 may be performed by a single database or by a storage device resident on business server 130. Databases 134 and 136 may also be available to servers 120 and 130 over network 110, rather than being linked to business server 130.

Business server 130 is a computing device comprising a processor and a memory capable of executing various software applications or utilities. Business server 130 can be accessed by a client device, such as client device 150, to provide services related to small business management. Business server 130 includes query 132 and is linked to transaction database 134 and business database 136.

Business database 136 stores information related to a plurality of businesses. Business server 130 may offer various management services to the plurality of businesses and store information related to the businesses in business database 136.

Transaction database 134 stores transactions of the plurality of businesses The transactions stored in transaction database 134 may have previously been processed by the business management services of business server 130. In other examples, the data stored by transaction database 134 and business database 136 may be stored in a single database or storage device. Query 132 is a similarity query related to the plurality of businesses. In other examples, query 132 may be generated by client device 150 based on input from a user client device 150.

Similarity server 120 is a computing device comprising a processor and a memory capable of executing various software applications or utilities. Similarity server 120 includes reduction module 122, comparison module 124, similarity index 126, vector generator 142, and vectors 144.

Reduction module 122 is a software routine or application executing on similarity server 120 used to perform dimensionality reduction on a set of vectors. Comparison module 124 is also a software routine or application executing on similarity server 120, but is used to determine a set of vectors similar to an input vector. In other examples, reduction module 122 and comparison module 124 may be components of a combined similarity application executing on similarity server 120, rather than separate applications.

Similarity index 126 is a data structure capable of storing vectors in a searchable format. A k-d tree may be one such data structure. Similarity index 126 is used by comparison module 124 to determine responses to similarity queries.

Vector generator 142 is software executing on similarity server 120 and used to generate vectors 144. Vector generator 142 may create vectors using classification data for sets of transactions. Vector generator 142 generates a set of vectors where each vector represents a business of the plurality of businesses, shown as vectors 144. In other examples, vectors 144 may be created by a human operator manually, although for large vectors, such as vectors with thousands of dimensions, human creation may be impractical. In such cases, vector generator 142 may be used.

Vectors 144 are a set of vectors corresponding to the plurality of businesses. In this example, each vector of vectors 144 has a number of dimensions with each dimension corresponding to a vendor. Vectors 144 may have as many dimensions as there are observations about the plurality of businesses that are identifiable through the transactions of transaction database 134. For example, a transaction may be a purchase transaction (between a business and a vendor) or a sale transaction (between a business and a customer). When using purchase transactions, one such attribute about the businesses may be the number of transactions between each business and each vendor. If purchase transactions are used to create vectors 144, every dimension of vectors 144 would correspond to a single vendor that is identifiable from the transactions.

Servers 120 and 130 may be used to perform a method for determining similarities between businesses. To do so, business server 130 may generate query 132. Query 132 may be generated by business server 130 in order for business server 130 to provide similarity information to a particular business or business owner. Query 132 may include data identifying a query business, for which similarity information is sought. After generating query 132, business server 130 transmits query 132 over network 110 to similarity server 120. In other examples, client device 150 may generate query 132 and transmit query 132 to similarity server 120, if a user of client device 150 seeks similarity information for the particular business.

To respond to query 132, similarity server 120 can use similarity index 126. To generate similarity index 126, similarity server 120 first accesses the information of business database 136 and transaction database 134. Vector generator 142 uses the information of business database 136 and transaction database 134 to generate vectors 144. In particular, vector generator 142 uses business database 136 to identify the plurality of businesses, and uses transaction database 134 to locate transactions associated with the plurality of businesses. In this example, the number of transactions between a business and each vendor are used as an observation to generate vectors 144, but other possible observations, such as those using sales transaction or different data from purchase transactions, may be used to generate vectors 144.

For example, there may be three vendors identifiable from the transactions, vendors A-C. Each of the vendors may be associated with a dimension in an n-dimensional space. Because in this example there are only three vendors, n=3 and a three-dimensional space may describe the business' transactions with vendors A-C. Thus, a first business may have 10 transactions with vendor A, 5 transactions with vendor B and no transactions with vendor C. In this example, the n=3 dimensional vector associated with the first business may be represented in text by {10, 5, 0} and may correspond to the point (10, 5, 0) in a three-dimensional vector space.

Small vectors, such as the three-dimensional vectors described in the preceding example, are generally easy to perform calculations on. However, as vectors become very large, e.g., as n becomes very large, the complexity of vector calculations increases significantly. So, in the example of vectors created using purchase transactions, such as stored in transaction database 134, vectors 144 have as many dimensions as there are unique vendors identifiable from the transactions, and there may be many thousands of vendors identifiable. Consequently, similarity server 120 performs dimensionality reduction on vectors 144 to create compact vectors. The compact vectors may have a dimensionality <n. Dimensionality reduction may have many benefits, such as making computations more process and space efficient, as well as reducing "noise" in the vector data. Because vectors may tend to have values for very few dimensions (e.g., a business that only has transactions with a few vendors of the thousands identified in transaction database 134), dimensionality can usually be reduced without losing the "signal" in the data.

To perform dimensionality reduction, reduction module 122 accesses vectors 144 and applies a dimensionality reduction technique. Many possible dimensionality reduction techniques exist and are usable by reduction module 122, such as principal component analysis, non-negative matrix factorization, linear discriminator analysis, non-linear discriminator analysis, and the skip-gram with negative sampling technique. The result of performing dimensionality reduction on vectors 144 is generating a set of compact vectors, which may be used to construct similarity index 126, for responding to similarity queries. In some examples, dimensionality reduction may be avoided if the original set of vectors is sufficiently compact for analysis purposes. For example, if the number of dimensions of the vectors is below a certain threshold, dimensionality reduction may be avoided. Alternatively, the sparsity of the vector space could be compared to a threshold, and if dense enough, dimensionality reduction may be avoided.

In order to verify that similarity index 126 can be used to respond to similarity queries accurately, a validation process may be employed. One such validation process involves obtaining a labeled set of cross validation data and evaluating a quality of the set of compact vectors for similarity queries using the labeled set of cross validation data. The labeled set of cross validation data may be created by an operator of similarity server 120 and includes correct similarity groups for all businesses with vectors of the compact vectors. By comparing the similarity results from the cross validation data to the responses produced by similarity index 126, it can be determined if the compact vectors that were used to construct the similarity server 126 are an accurate representation of the plurality of businesses. If the compact vectors are not an accurate representation of the plurality of businesses, the modules of similarity server 120 that were used to generate the compact vectors, namely vector generator 142 and reduction module 122, may be adjusted. For example, reduction module 122 may have reduced vectors 144 by too many (or too few) dimensions, or vector generator 142 may have used information to generate vectors 144 that should have been avoided.

After similarity index 126 is generated, comparison module 124 uses similarity index 126 to determine a response to query 132. As discussed, in this example query 132 includes information identifying a query business. To determine the response, first, a vector corresponding to the query business is located by comparison module 124. Then, using similarity index 126, comparison module 124 identifies a set of vectors similar to the vector corresponding to the query business. Each vector of similarity index 126 corresponds to a business, identified by a label (e.g., metadata) of the vector, so the set of vectors similar to the vector corresponding to the query business in turn correspond to a set of similar businesses. The set of similar businesses have associated business profiles stored in business database 136. The response to query 132 may be a message to business server 130 identifying the set of similar businesses.

Figure 2A:
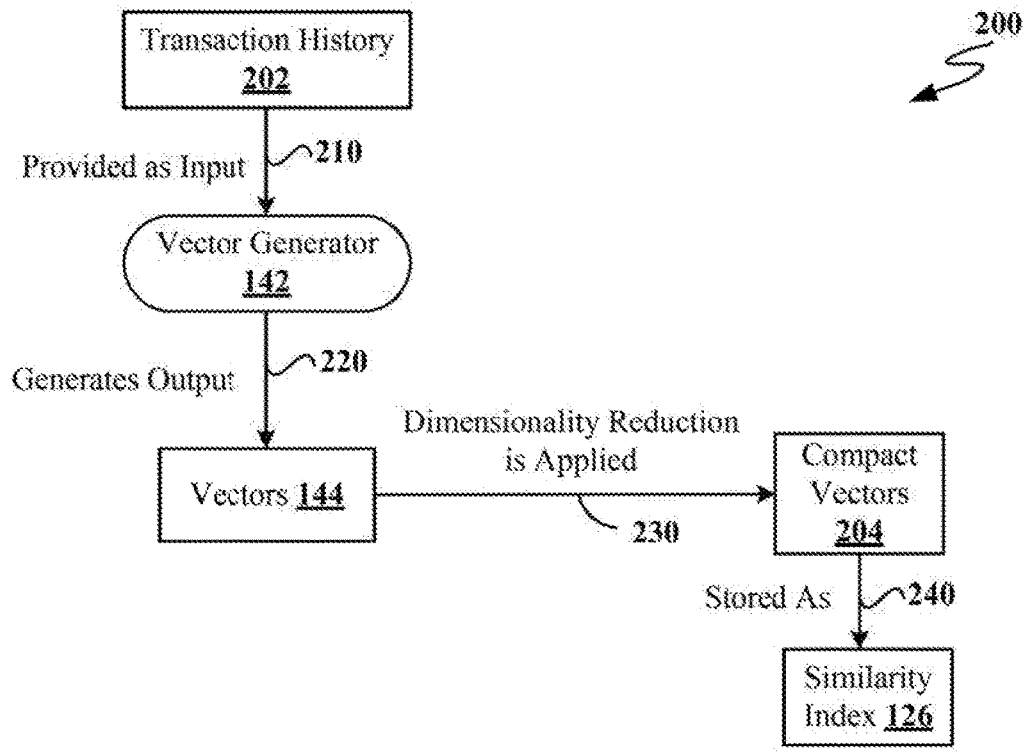
FIG. 2A is a conceptual illustration of a process for generating a similarity index.

FIG. 2A is a conceptual illustration of a process 200 for generating a similarity index. Process 200 includes transaction history 202, vector generator 142, vectors 144, compact vectors 204 and similarity index 206.

Process 200 begins at 210, where transaction history 202 is provided to vector generator 142 as input. Transaction history 202 is a set of transactions for known businesses. Transaction history 202 may be obtained from a transaction history database, such as transactions database 134 of FIG. 1. The set of transactions may have a number of usable observations about the known businesses that can be used to create vectors 144. For example, the set of transactions may include a record of all purchase transactions for the known businesses.

At 220, vector generator 142 generates vectors 144 as output. Vector generator 142 accesses the transactions of transaction history 202 for analysis. In general, vector generator 142 performs feature extraction on the transactions to generate vectors 144. If vectors 144 are based on the number of transactions between each business and each vendor, vector generator 142 examines a transaction to identify at least a business of the transaction and a vendor of the transaction, and increments the value of the dimension associated with the vendor for the vector associated with the business. If vectors 144 are based on another observation, such as the amount each business spent with each vendor, vector generator 142 may further identify an amount associated with the transaction, and add the identified amount to the value of the dimension associated with vendor for the vector associated with the business. Vector generator 142 may be capable of analyzing computer-readable text for digital transaction records. If the transactions of transaction history 202 include digital images of physical transaction documents, an optical character recognition (OCR) process may be performed on the transactions before analysis by vector generator 142.

In this example, vectors 144 are based on transaction history 202, so vectors 144 can have as many dimensions as there are usable observations about the transactions. When based on transaction history 202 vectors 144 may have a large number of dimensions, which make calculations involving vectors 144 computationally expensive and time consuming. Additionally, high-dimensional vectors occupy a large vector space. In general, large vector spaces tend to have sparse distributions of vectors, which can make vector similarity calculations more complicated and less useful. Two methods of computing vector similarity are metric similarity (the distance between vectors in vector space) and angular similarity (the difference in orthogonal direction of vectors). Vector similarity calculations using either metric or angular similarity are negatively affected by sparse vector spaces, as sparse vector spaces result in similarity computations that may be made inaccurate by the noise of the sparse vector space. For example, in a high dimensional space vectors may appear more dissimilar than they would if plotted in a lower dimensional space. As a result, attempting to compute similarity of high-dimensional vectors can provide inaccurate results.

At 230, dimensionality reduction is applied to vectors 144. In general, dimensionality reduction techniques are used to reduce the dimensions of a set of vectors to a smaller dimensional space that is more efficient computationally. Dimensionality reduction techniques identify the most meaningful dimensions of the set of vectors and use the most meaningful dimensions in a set of newly created compact vectors. Meaningful dimensions refer to the dimensions of vectors 144 that capture the most variance between vectors 144. The result is that the set of compact vectors are still distinct from one another (as the most meaningful dimensions are used), but are easier to perform calculations on. Further, the data used to create vectors may be noisy, meaning that some elements of the data are meaningless. By removing the least meaningful dimensions, dimensionality reduction may also reduce the noise in the vectors. The result of 230 is a set of compact vectors 204 which contain dimensions of vectors 144 that capture the most variance of vectors 144 (e.g., the most meaningful dimensions of vectors 144).

If vector similarity is calculated based on angular similarity, the dimensions of vectors 144 to include in the compact vectors may be identified based on orthogonal directions in vector space. That is, a set of orthogonal directions that account for largest amount of variance between the set of vectors may be identified. Once identified, the set of vectors are projected onto the identified set of orthogonal directions. In particular, the set of vectors may be projected on to a line that is parallel to each orthogonal direction of the set of orthogonal directions. The result of such a projection is a set of compact vectors based on only the most meaningful directions of the set of vectors.

At 240, compact vectors 204 are stored as similarity index 126. In general, compact vectors 204 may be stored using any data structure capable of storing vectors. One such data structure is a k-d tree. A k-d tree is a data structure of k dimensions, which partitions the vector space of the stored data. If a k-d tree is used to store compact vectors 204, space partitioning may be used to create sub-spaces of similar compact vectors. When so stored, compact vectors 204 may be returned as a subset of vectors within a particular partition of vector space, which indicates the subset of vectors are similar to one another. In other examples, compact vectors 204 may be stored as clusters of vectors identified as similar. If so, each individual cluster may include vectors corresponding to a vectors stored as a partition described above. In such an example, using similarity index 126 results in the identification of a particular cluster similar to an input vector. In general, when given a particular vector as input, similarity index 126 may be used to identify a subset of compact vectors 204 that are similar to the particular vector.

Figure 2B:
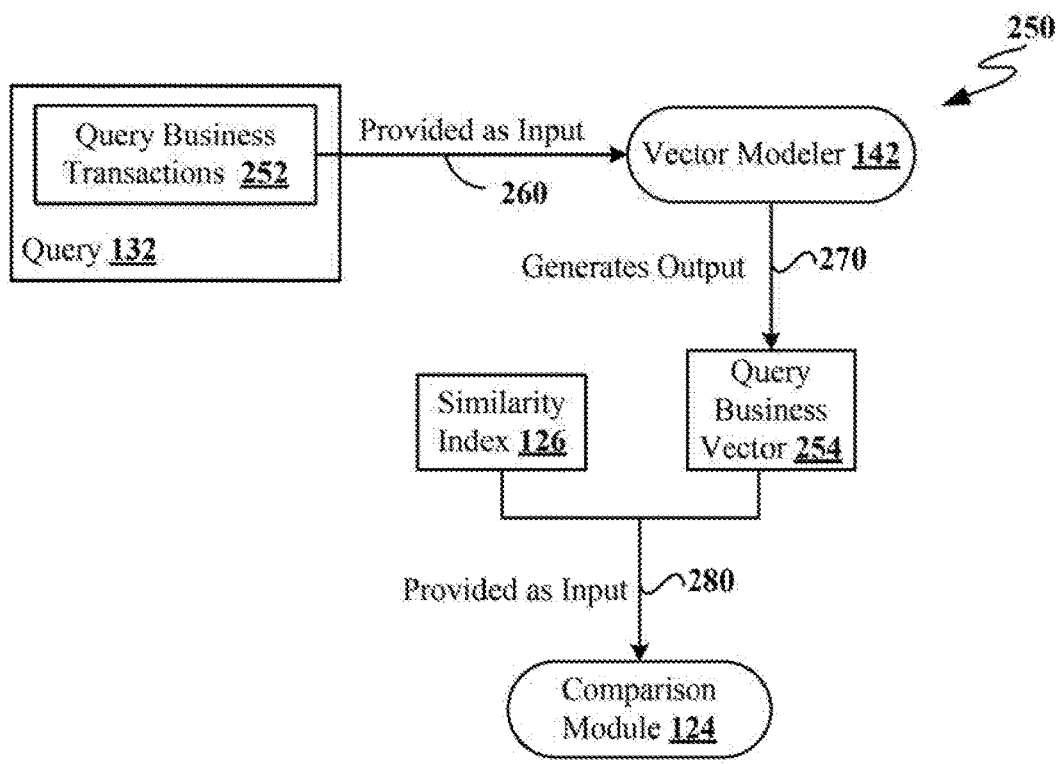
FIG. 2B is a conceptual illustration of a process for using a similarity index to respond to a similarity query.

FIG. 2B is a conceptual illustration of a process 250 for using a similarity index to respond to a similarity query. Process 250 includes query 132, vector generator 142, query business vector 254, similarity index 126 and comparison module 124.

Process 250 begins at 260, where query business transactions 252 are provided as input to vector generator 142. Query business transactions 252 comprise part of query 132, and are transactions associated with a query business. The query business is the subject of a request for businesses that are similar to the query business.

At 270 vector generator 142 uses the query business transactions 252 to generate query business vector 254 as output. The process of generating query business vector 254 is substantially similar to the process used to generate vectors 144 described above with respect to FIG. 2A. If the dimensions of query business vector 254 correspond to the number of transactions between the query business and each vendor, vector generator 142 may extract a vendor associated with each transaction of query business transactions 252 and increment the dimension of query business vector 254 associated with the vendor.

At 280, similarity index 126 and query business vector 254 are provided as input to comparison module 124. In general, comparison module 124 identifies a set of vectors stored within similarity index 126. If similarity index 126 is a k-d tree, comparison module identifies a partition of similarity index 126 where query business vector 254 would be stored. The vectors stored in the partition are vectors similar to the query business vector 254, and so the businesses associated with the vectors stored in the partition are the businesses similar to the query business. By so determining the businesses similar to the query business, comparison module 124 is capable of responding to query 132.

Figure 3:
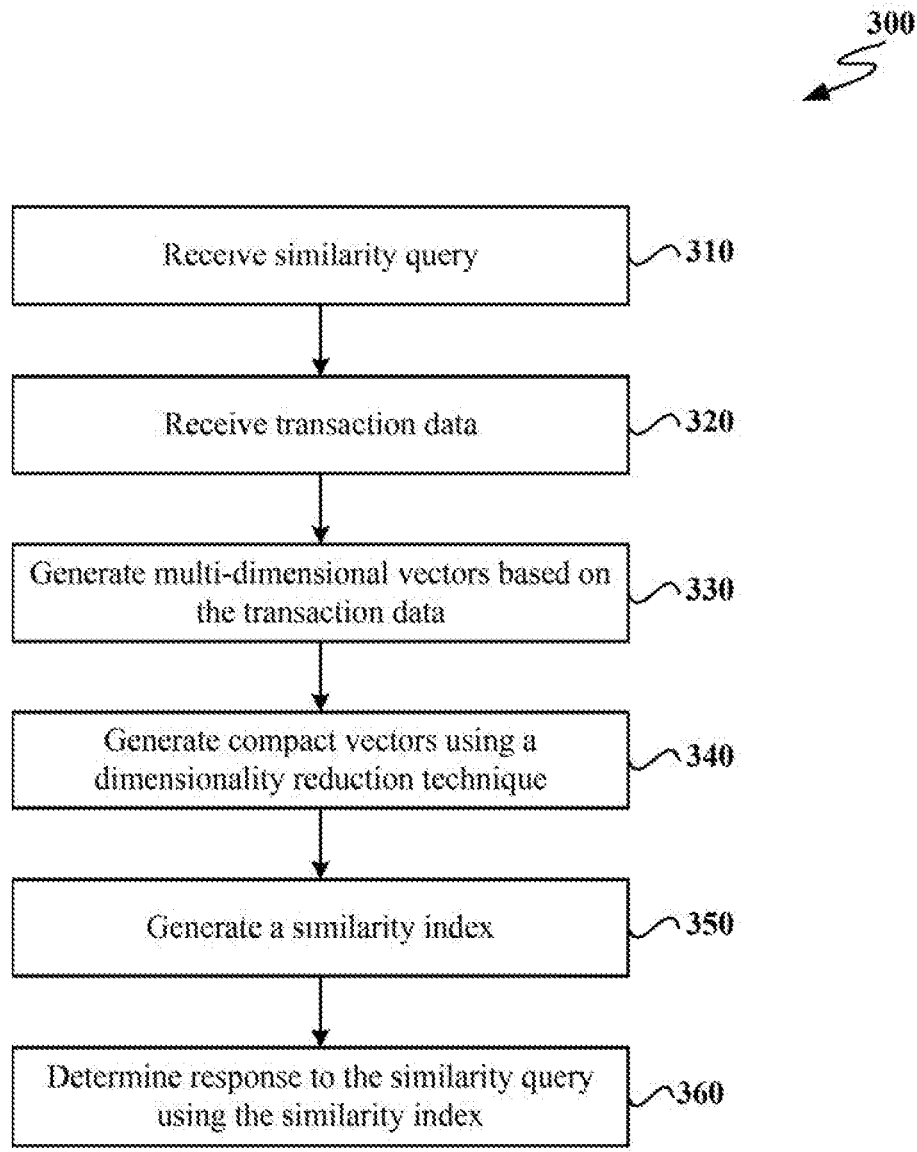
FIG. 3 is a flow diagram for an example method for responding to similarity queries using dimensionality reduction.

FIG. 3 is a flow diagram for an example method 300 for responding to similarity queries. Method 300 may be performed by a similarity server, such as similarity server 120 of FIG. 1.

Method 300 begins at step 310, where a similarity query is received. The query may be received from a remote computing device across a network, such as business server 130 or client device 150 of FIG. 1. In other examples, the similarity server may itself generate a query based on input from a user of the similarity server.

At step 320, the similarity server receives transaction data. The transaction data may be sent by a business server from a database storing transactions for a plurality of businesses, such as transaction database 134 of FIG. 1. Transaction data may also be obtained by the similarity server from the transaction database. The transaction data may be stored in a variety of formats. For example, each transaction of the transaction data may be a digitized text document containing the information of a particular transaction, such as the two parties to the transaction, the amount of the transaction, the time of the transaction or any other pertinent details. The transaction data may also be a table of transaction data, or another data structure of computer-readable transaction data. In this example, the transaction data includes at least an identifier for a business and an identifier for a vendor as described above with respect to FIG. 1. In general, the transaction data can be used to compare the similarity of businesses identifiable in the transaction data.

At 330, the similarity server generates vectors based on the transaction data. As discussed above, the vectors are created based on the transaction data. The vectors can be plotted in vector space of as many dimensions as the vectors have. In general, a vector corresponds to a business as identified in the transaction data, and a dimension of a vector corresponds to an observation about the business corresponding to that vector. In this example, the dimensions correspond to the vendors identified in the transaction data. Depending on the number of identified vendors, the vectors may have so many dimensions so as to make calculations time consuming, as discussed above.

To compensate for the large dimensions of the vectors, at 340 the similarity server generates compact vectors based on the vectors using a dimensionality reduction technique. Compared to the vectors, the compact vectors include fewer dimensions and can be plotted in a lower-dimensional vector space. As discussed, the dimensionality reduction technique may be any of a number of different dimensionality reduction techniques, including principal component analysis, principal component analysis using the kernel trick, skip-gram with negative sampling, non-negative matrix factorization, linear discriminant analysis or generalized discriminant analysis among others. In general, the dimensionality reduction technique used is capable of identifying the most meaningful dimensions among the vectors and preserving those dimensions in the compact vectors. The dimensions of the compact vectors are the most meaningful dimensions (e.g., the dimensions of the vectors that capture the most variance) of the vectors.

At step 350, the similarity server generates a similarity index for responding to similarity queries, based on the compact vectors. In this example, the similarity index is a k-d tree that has partitioned the vector space of the compact vectors to create regions or partitions of subsets of the compact vectors. In general the similarity index is a storage of the compact vectors arranged or marked so as to simplify locating vectors similar to a given vector. Because of this, vector similarity calculations may need to be performed on the compact vectors in order to generate the similarity index. In general, unsupervised classification methods may be used to generate the similarity index. For example, the similarity server may apply a k-nearest neighbors technique (k-NN) to the set of compact vectors to create a classified vector set. Other possible classification methods include k-means clustering or the use of support vector machines. The classified vector set can then be saved (such as in a k-d tree) to facilitate searching for vectors to respond to a similarity query.

At 360, the similarity server determines a response to the similarity query using the similarity index. In general, the similarity query includes a query business, and the similarity query is a request for data of businesses similar to the query business. By using the similarity index, the similarity server can determine a subset of the compact vectors similar to the query business. In some examples the query business is known to the similarity server, and in such examples determining the subset of the compact vectors similar to the query business involves locating the compact vector corresponding to the query business and identifying the subset of compact vectors most similar to the vector corresponding to the query business. The similarity server may then access business profiles of the businesses corresponding to the subset of compact vectors. The similarity server then transmits those business profiles in response to the similarity query.

In some embodiments, determining the response to the similarity query using the similarity index includes generating a query vector associated with the query business based on transaction history of the query and identifying, based on the similarity index, a subset of compact vectors within the set of compact vectors most similar to the query vector. In such embodiments, determining the response to the similarity query using the similarity index may also include obtaining business profiles for the businesses associated with the subset of compact vectors.

In some embodiments of method 300, applying the dimensionality reduction technique comprises identifying a set of orthogonal directions that account for largest amount of variance between the set of vectors and projecting the set of vectors from an original vector space onto the subset of orthogonal directions that account for largest amount of variance between the set of vectors in a lower dimensional space.

Method 300 may also include additional steps for evaluating the compact vectors. Such additional steps include obtaining a labeled set of cross validation data and evaluating a quality of the set of compact vectors for similarity queries using the labeled set of cross validation data.

Figure 4:
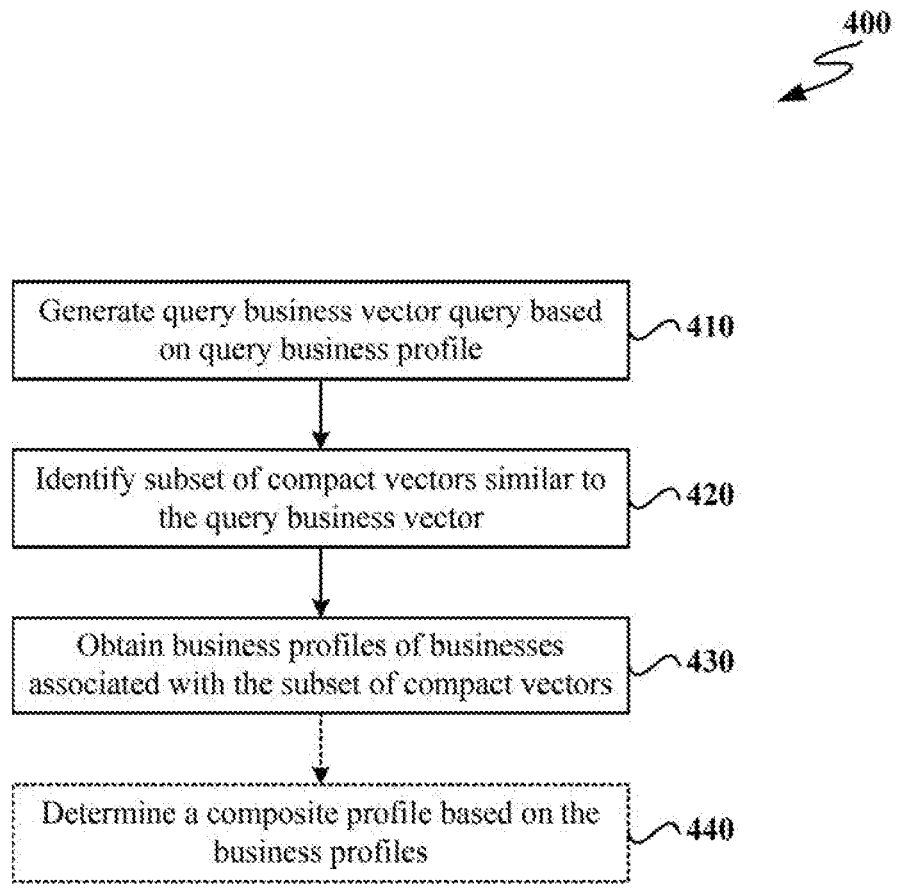
FIG. 4 is a flow diagram for an example method for responding to a similarity query including a query business profile.

FIG. 4 is a flow diagram for an example method 400 for determining a response to a similarity query including query business transactions. Method 400 may be performed by a similarity server, such as similarity server 120 of FIG. 1. Method 400 may be performed as a continuation of method 300, as described above with respect to FIG. 3.

Method 400 begins at step 410 where the similarity server generates a business query vector based on query business transactions. For some similarity queries, the query business may be unknown to the similarity server, and thus does not initially correspond to a vector within the similarity index. If so, determining the subset of the compact vectors similar to the query business involves generating a query business vector corresponding to the query business and based on the query business transactions.

At step 420 the similarity server identifies a subset of the compact vectors corresponding to the business query vector. This may be done by adding the query business vector to the compact vectors. Thereafter, the similarity index can be re-generated (e.g., the classification method used to generate the similarity index may be re-executed) using the compact vectors including the query vector. From that point, determining a response to the similarity query may be substantially similar to the process for determining a response to the similarity query when the query business is known to the similarity server, including determining which of the compact vectors are most similar (e.g., the closest in vector space) to the query business vector.

At step 430 the similarity server obtains business profiles of businesses associated with the subset of compact vectors identified at step 420. Business profiles include information related to a business that is not expressed in the vector corresponding to the business. For example, a business profile may include demographic information about the business such as age, location or size, as well as financial information about the business, such as revenue, expenses, profit or taxes. Because of the similarity of the vectors corresponding to the businesses, the information included in the business profiles may be useful to the owner of the query business. In particular, a business owner may be able to use such information to determine how similar businesses are structured, the expenses of similar businesses, or a variety of other data points that may assist in the management of the business. The business profiles may be obtained by the similarity server from a business database, such as business database 136.

At step 440 the similarity server may also generate a composite profile based on the business profiles to represent an average of numerical data points of each business represented across the business profiles. Such a composite profile may present a helpful estimation of how similar businesses tend structure their finances. The similarity server may then transmit the composite profile in response to the similarity query.

Figure 5:
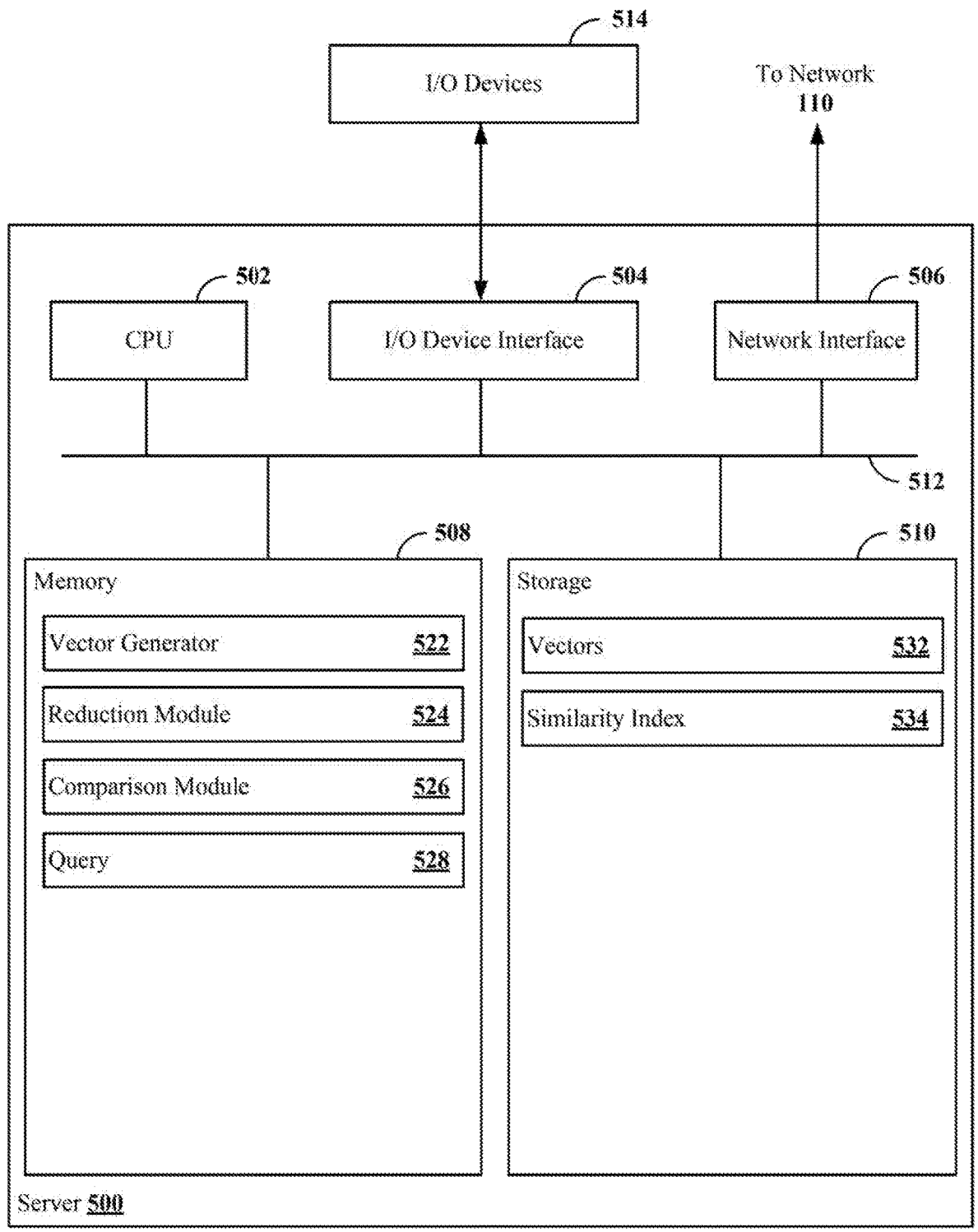
FIG. 5 depicts an example server for use in responding to similarity queries using dimensionality reduction.

FIG. 5 depicts an example server 500 for use in responding to similarity queries using dimensionality reduction. As shown, the server 500 includes a central processing unit (CPU) 502, one or more input/output (I/O) device interfaces 504, which may allow for the connection of various I/O devices 514 (e.g., keyboards, displays, mouse devices, pen input, etc.) to server 500, network interface 506, memory 508, storage 510, and an interconnect 512.

The CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. The CPU 502 is included to be representative of a single CPU, multiple CPUs, a single CPU having multiple processing cores, and the like. The I/O device interface 504 may provide an interface for capturing data from one or more input devices integrated into or connected to the server 500, such as keyboards, mice, touchscreens, and so on. The memory 508 may represent a random access memory (RAM), while the storage 510 may be a solid state drive, for example. Although shown as a single unit, the storage 510 may be a combination of fixed and/or removable storage devices, such as fixed drives, removable memory cards, network attached storage (NAS), or cloud-based storage.

As shown, the memory 508 includes vector generator 522, reduction module 524, comparisons module 526 and query 528. Vector generator 522, reduction module 524 and comparisons module 526 are applications executed based on instructions stored in the storage 510. Such instructions may be executed by the CPU 502. Query 528 is data temporarily resident in memory 508.

As shown, the storage 510 includes vectors 532 and similarity index 534. Vectors 532 and similarity index 534 may be used by software executing out of memory 508 to execute a method for determining the similarity between businesses using vector representations of businesses and dimensionality reduction. In particular, vector generator 522 may create vectors 532 based on transaction data obtained from a transaction database via network interface 506. Reduction module 524 may then apply a dimensionality reduction technique to produce compact vectors out of vectors 536, which can be used to construct similarity index 534. Comparison module 526 may then determine a response to query 528 using similarity index 536.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for determining similarities between businesses, comprising:
    receiving a similarity query regarding a query business;
    receiving transaction data associated with a plurality of businesses for comparing the plurality of businesses;
    generating a set of vectors representing the plurality of businesses based on the transaction data, wherein each respective vector of the set of vectors represents a respective business of the plurality of businesses and is based on a respective subset of the transaction data that is associated with the respective business;
    generating a set of compact vectors based on the set of vectors by applying a dimensionality reduction technique to the set of vectors;
    generating a similarity index based on comparing a compact query business vector to the set of compact vectors; and
    determining a response to the similarity query using the similarity index.

2. The method of claim 1, wherein the similarity query includes a query business profile for the query business.

3. The method of claim 2, wherein determining the response to the similarity query using the similarity index comprises:
    identifying, based on the similarity index, a subset of compact vectors within the set of compact vectors most similar to the compact query business vector; and
    obtaining business profiles for the businesses associated with the subset of compact vectors.

4. The method of claim 3, further comprising determining a composite profile based on the business profiles for the businesses associated with the subset of compact vectors.

5. The method of claim 1, wherein applying the dimensionality reduction technique comprises:
    identifying a set of orthogonal directions that account for largest amount of variance between the set of vectors; and
    projecting the set of vectors onto the set of orthogonal directions that account for the largest amount of variance between the set of vectors.

6. The method of claim 1, wherein the dimensionality reduction technique is a skip-gram with negative sampling technique.

7. The method of claim 1, wherein the similarity index comprises:
    applying a K-nearest neighbors technique (k-NN) to the set of compact vectors to create a classified vector set; and
    storing the classified vector set in a data structure for efficient searching.

8. The method of claim 7, wherein the data structure is a k-d tree.

9. The method of claim 1, further comprising:
    obtaining a labeled set of cross validation data; and
    evaluating a quality of the set of compact vectors using the labeled set of cross validation data.

10. A computing device, comprising:
    a processor; and
    a memory including computer readable instructions, which, when executed by the processor, cause the computing device to perform a method for determining similarities between businesses, the method comprising:

receiving a similarity query regarding a query business;

receiving transaction data associated with a plurality of businesses for comparing the plurality of businesses;

generating a set of vectors representing the plurality of businesses based on the transaction data, wherein each respective vector of the set of vectors represents a respective business of the plurality of businesses and is based on a respective subset of the transaction data that is associated with the respective business;

generating a set of compact vectors based on the set of vectors by applying a dimensionality reduction technique to the set of vectors;

generating a similarity index based on comparing a compact query business vector to the set of compact vectors; and determining a response to the similarity query using the similarity index.

11. The computing device of claim 10, wherein the similarity query includes a query business profile for the query business.

12. The computing device of claim 11, wherein determining the response to the similarity query using the similarity index comprises:

identifying, based on the similarity index, a subset of compact vectors within the set of compact vectors most similar to the compact query business vector; and obtaining business profiles for the businesses associated with the subset of compact vectors.

13. The computing device of claim 12, the method further comprising determining a composite profile based on the business profiles for the businesses associated with the subset of compact vectors.

14. The computing device of claim 10, wherein applying the dimensionality reduction technique comprises:

identifying a set of orthogonal directions that account for largest amount of variance between the set of vectors; and projecting the set of vectors onto the set of orthogonal directions that account for the largest amount of variance between the set of vectors.

15. The computing device of claim 10, wherein the dimensionality reduction technique is a skip-gram with negative sampling technique.

16. The computing device of claim 10, wherein the similarity index comprises:

applying a K-nearest neighbors technique (k-NN) to the set of compact vectors to create a classified vector set; and storing the classified vector set in a data structure for efficient searching.

17. The computing device of claim 16, wherein the data structure is a k-d tree.

18. The computing device of claim 10, further comprising:

obtaining a labeled set of cross validation data; and evaluating a quality of the set of compact vectors using the labeled set of cross validation data.

19. A non-transitory computer readable medium comprising instructions, which when executed by a processor of a computing device, cause the computing device to perform a method for determining similarities between businesses, the method comprising:

receiving a similarity query regarding a query business;

receiving transaction data associated with a plurality of businesses for comparing the plurality of businesses;

generating a set of vectors representing the plurality of businesses based on the transaction data, wherein each respective vector of the set of vectors represents a respective business of the plurality of businesses and is based on a respective subset of the transaction data that is associated with the respective business;

generating a set of compact vectors based on the set of vectors by applying a dimensionality reduction technique to the set of vectors;

generating a similarity index based on comparing a compact query business vector to the set of compact vectors; and determining a response to the similarity query using the similarity index.

20. The non-transitory computer readable medium of claim 19, wherein determining the response to the similarity query using the similarity index comprises:

identifying, based on the similarity index, a subset of compact vectors within the set of compact vectors most similar to the compact query business vector; and obtaining business profiles for the businesses associated with the subset of compact vectors.

* * * * *